(12) United States Patent
Carney

(10) Patent No.: US 9,719,765 B2
(45) Date of Patent: Aug. 1, 2017

(54) DEVICE AND METHOD FOR MEASURING AN ANTLER

(71) Applicant: Christopher R. Carney, Natchez, MS (US)

(72) Inventor: Christopher R. Carney, Natchez, MS (US)

( * ) Notice: Subject to any disclaimer, the term of this patent is extended or adjusted under 35 U.S.C. 154(b) by 0 days.

(21) Appl. No.: 14/335,064

(22) Filed: Jul. 18, 2014

(65) Prior Publication Data

US 2016/0018205 A1   Jan. 21, 2016

(51) Int. Cl.
*G01B 3/10* (2006.01)

(52) U.S. Cl.
CPC .... *G01B 3/1084* (2013.01); *G01B 2003/1097* (2013.01)

(58) Field of Classification Search
CPC .............. G01B 3/1056; G01B 3/1082; G01B 2003/1089; G01B 3/1084; G01B 3/1071; G01B 3/10; G01B 2003/1048; G01B 2003/1094; G01B 3/1041; G01B 2003/1046
USPC ........................................... 33/511, 755–771
See application file for complete search history.

(56) References Cited

U.S. PATENT DOCUMENTS

| | | | |
|---|---|---|---|
| 4,351,113 A | 9/1982 | Eggertsen et al. | |
| 4,425,391 A * | 1/1984 | Wilson | D05B 35/12 33/494 |
| 6,115,932 A * | 9/2000 | Fedora | A01K 97/00 33/494 |
| 6,237,243 B1 * | 5/2001 | Cook | G01B 3/1082 33/758 |
| 6,772,532 B1 | 8/2004 | Honea | |
| 6,889,444 B2 | 5/2005 | Trout et al. | |
| 7,472,488 B2 | 1/2009 | Besch | |
| 7,581,333 B2 | 9/2009 | Dressler | |
| 7,644,510 B2 | 1/2010 | Gingerella et al. | |
| 2001/0022035 A1 * | 9/2001 | Veloce | G01B 3/02 33/758 |
| 2005/0257393 A1 * | 11/2005 | Spanski | G01B 3/1002 33/758 |
| 2006/0026856 A1 | 2/2006 | Scott | |
| 2007/0271806 A1 * | 11/2007 | Dressler | G01B 3/10 33/758 |
| 2008/0010848 A1 * | 1/2008 | Miles | B65H 35/0086 33/758 |
| 2009/0042027 A1 | 2/2009 | Trainello | |

(Continued)

*Primary Examiner* — Yaritza Guadalupe-McCall
(74) *Attorney, Agent, or Firm* — Dale J. Ream

(57) ABSTRACT

A method for measuring an antler rack having a plurality of beams includes the steps of providing a flexible measuring tape that includes a front surface having graduated indicia printed thereon and a rear surface having an adhesive layer. A free end of the measuring tape is positioned at the tip of a selected beam of the antler rack and the tape extended to a terminal point/end of the tape. The measuring tape is severed at the terminal point so as to determine a length of the selected beam. Then, the severed portion is adhered to the selected beam to indicate that the selected beam has been measured. These steps are repeated until all beams have been measured and respective severed portions have been adhered to the antler rack. The adhered portions are then viewed and the highest numerical graduation indicates the score of the antler.

4 Claims, 3 Drawing Sheets

(56) References Cited

U.S. PATENT DOCUMENTS

2010/0088915 A1* 4/2010 Neff ...................... A61B 5/107
33/759
2014/0109425 A1* 4/2014 Brotman .................. G01B 3/10
33/759

* cited by examiner

DEVICE AND METHOD FOR MEASURING AN ANTLER

BACKGROUND OF THE INVENTION

This invention relates generally to measuring devices and, more particularly, to a measuring tape and method for measuring or "scoring" an antler. The method for measuring an antler includes adhering severed portions of the measuring tape to respective beams of an antler rack.

A hunter desires to "score" an antler rack to determine how it compares to antlers from a previous kill made by the hunter or to antlers obtained by another hunter. In fact, there are hunting clubs having contests or collections where recognition or rewards are given to antlers having the highest measurement or score. Accordingly, there are devices and methods regarding how to measure an antler rack.

Although assumably effective for their intended purposes, the existing methods for measuring an antler typically require measurement with a ruler, such as with a flexible ruled device. As measurements are made, a distance is first read and then recorded, such as on a tabulation sheet or scratch paper. When all measurements have been made, the intermediate results must be tabulated to determine a final measurement or score. This method also risks that one or more beams of an antler may be forgotten or calculated more than once.

Therefore, it would be desirable to have a measuring tape and method for measuring an antler in which a flexible adhesive-backed measuring tape is extended along a beam of an antler, severed at a terminal point thereof, and adhered to the measured beam. These steps are then repeated until every antler beam is covered by a severed portion of the measuring tape. Finally, it would be desirable to have a measuring tape that includes increasing numerical indicia such that a highest measurement can be quickly determined once every antler is covered with a severed portion.

SUMMARY OF THE INVENTION

A method for measuring an antler rack having a plurality of beams according to the present invention includes the steps of providing a flexible measuring tape that includes a front surface having graduated indicia printed thereof and a rear surface having an adhesive layer. A free end of the measuring tape is positioned at the tip of a selected beam of the antler rack and the tape extended to a terminal point/end of the tape. The measuring tape is severed at the terminal point so as to determine a length of the selected beam. Then, the severed portion is adhered to the selected beam to indicate that beam has been measured. These steps are repeated until all beams have been measured and respective severed portions have been adhered to the antler rack. The adhered portions are then viewed and the highest numerical graduation indicates the score of the antler.

Therefore, a general object of this invention is to provide an elongate flexible measuring tape in which a front surface includes an increasing scale of numerical indicia, i.e. ruler-type measurements.

Another object of this invention is to provide a measuring tape, as aforesaid, that is arranged on a roll so that it may be extended along a band of an antler.

Still another object of this invention is to provide a measuring tape, as aforesaid, in which a rear surface includes an adhesive layer.

Yet another object of this invention is to provide a method for measuring an antler, as aforesaid, in which the measuring tape is extended across a beam, the extended portion of the tape is severed, and the severed portion is adhered to the measured beam.

A further object of this invention is to provide a method for measuring an antler, as aforesaid, in which respective severed portions of the measuring tape are adhered to respectively measured beams.

A still further object of this invention is to provide a method for measuring an antler, as aforesaid, in which the highest numerical indicia adhered to a beam of the antler is the final score of the antler.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
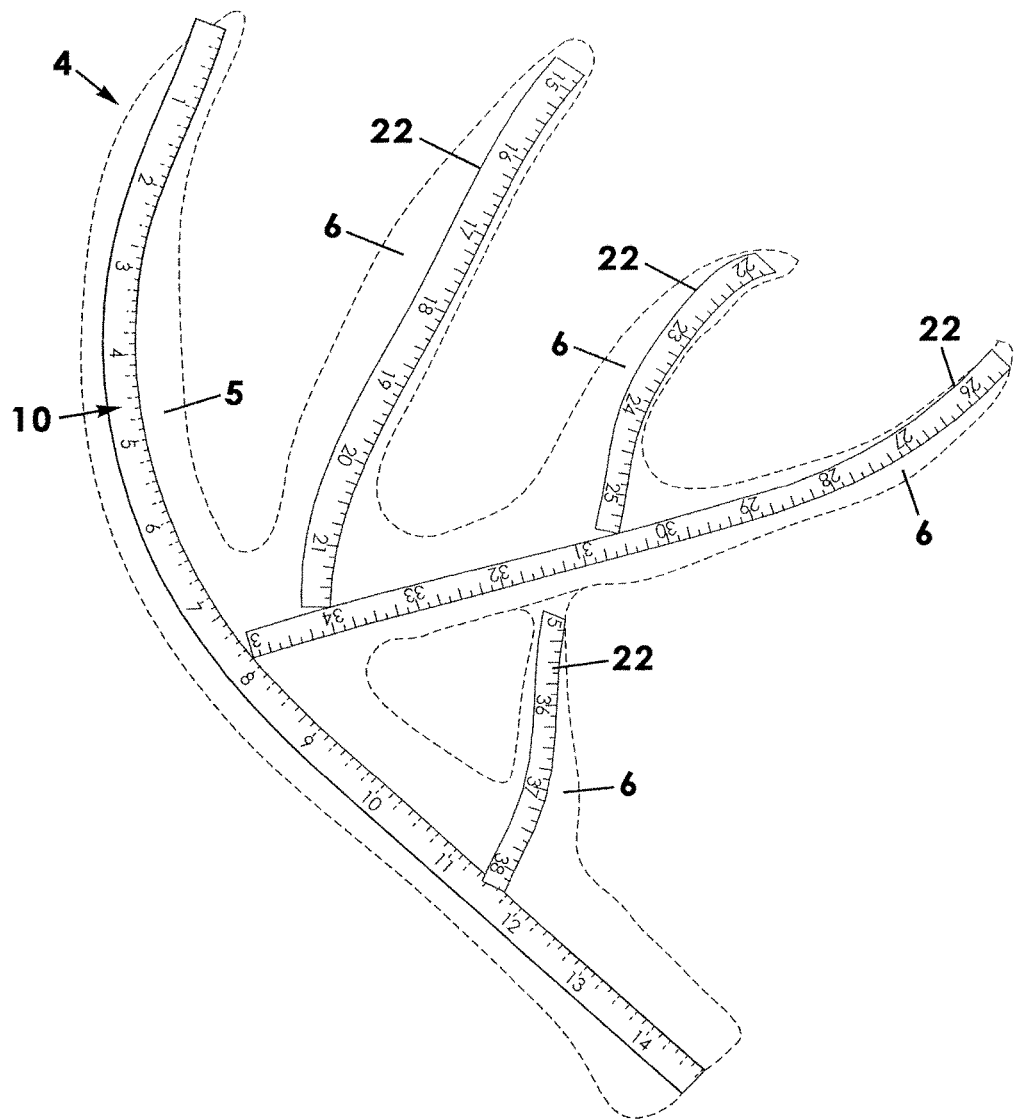
FIG. 1 is a perspective view of a measuring device and method for measuring an antler according to a preferred embodiment of the present invention in use with an antler.
Figure 2:
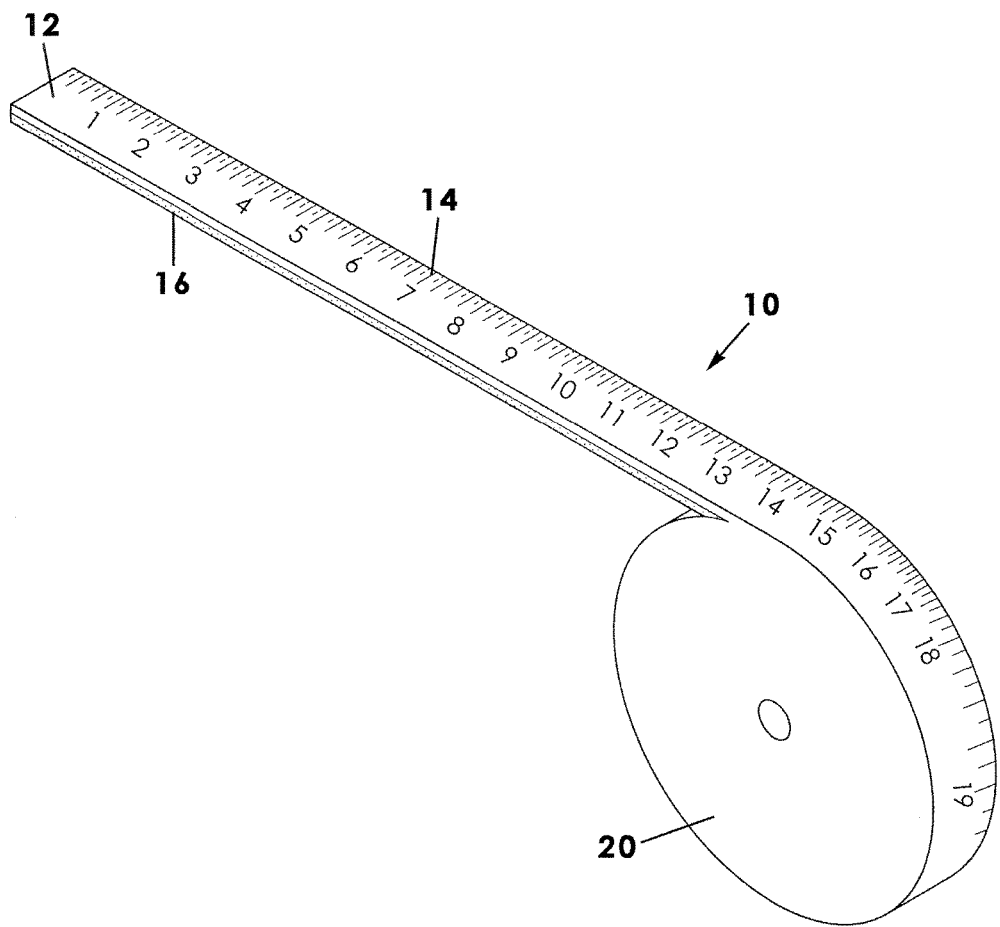
FIG. 2 is a perspective view of the measuring tape arranged as a roll.
Figure 3:
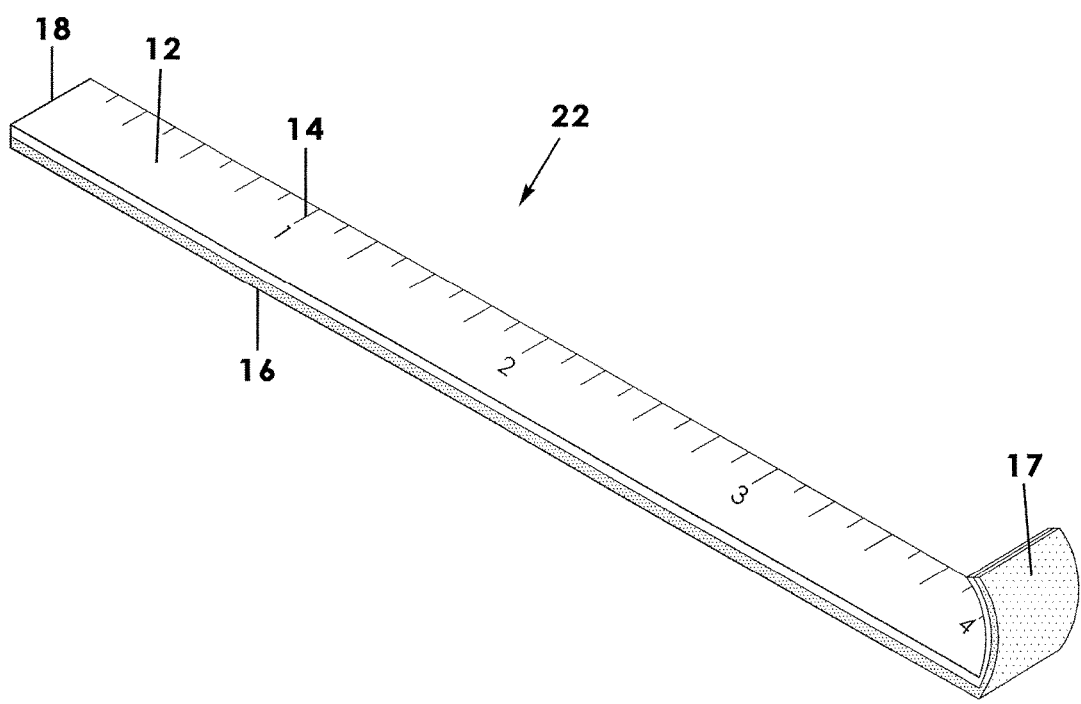
FIG. 3 is a perspective view of a severed portion of the measuring tape as in FIG. 2.

A measuring tape and method for measuring an antler will now be described with reference to FIGS. 1 to 3 of the accompanying drawings.

The measuring tape 10 includes an elongate, flexible strip configured to accurately measure objects having an irregular shape such as, in the present instance, an antler of a deer or the like. More particularly, the measuring tape 10 includes a planar or generally flat configuration and includes parallel edges extending in a linear configuration. The measuring tape 10 includes a front surface 12 having graduated numerical indicia 14, such as ruler markings. Preferably, the markings are spaced apart at ⅛ inch intervals although other scales or intervals would also work.

The measuring tape 10 includes a rear surface 16 opposite the front surface 12 which includes an adhesive layer 17 that is suitable to adhere the measuring tape 10 to another surface such as an antler, as will be described further below. In one embodiment, the adhesive layer of adhesive material may be covered by a backing strip (not shown) that must be removed to expose the adhesive layer. Preferably, the flexible strip of the measuring tape 10 is situated on a roll 20 as shown in FIG. 2 such that portions or segments of the measuring tape 10 may be extended across portions of an antler and, when the portion of the antler 4 is covered, the extended portion may be severed and then adhered to the antler 4, as will be described in more detail below.

The present invention presents a method for effectively measuring an antler 4 (also referred to as an antler rack). An antler 4 may include a main beam 5 and a plurality of additional beams 6, which may also be referred to as tines. The main beam 5 refers to the beam that essentially runs the length of the entire antler 4—from tip to burr 7—and from which the additional beams 6 or tines extend. Each beam 6 may include a tip or "point" and the antler 4 may include a brow or burr 7, which refers to the point at which the antler 4 was joined to the head of a deer.

The method of measuring or "scoring" an antler includes the steps of measuring the lengths of the main beam 5 and each additional beam 6. In the past, the individual lengths of each beam was read using a ruler of some kind and then added together to reach a total length score. In some cases, the circumference of one or more beams may also be measured and added to the total score.

According to the present method, a free end 18 of the measuring tape 10 is positioned at a tip of the main beam. Initially, the free end 18 of the measuring tape 10 would be associated with a "0" measurement on the front surface of the measuring tape 10, the indicia getting larger going away from the free end 18. Holding the free end 18 of the measuring tape 10 on the tip of the main beam 5, the measuring tape 10 is extended to the end of the main beam 5, such as by unrolling the roll 20. The end of the main beam 5 (which may be adjacent the burr 7) may be referred to as a "terminal point," meaning the end of a measurement of the main beam 5.

Next, the measuring tape 10 may be severed adjacent the terminal point, i.e. the end of the beam being measured. The tape 10 may be severed by tearing although severing may be done with a cutting device such as a knife or scissors. It is understood that severing a portion of the measuring tape 10 establishes a new free end of a remainder of the measuring tape 10. The severed portion 22 of the measuring tape 10 is indicative of a length of the measured beam. The severed portion 22 is then adhered directly to the selected/measured beam 6 of the antler 4. Specifically, the severed portion 22 positioned on the main beam 5 is adhered directly to the main beam 5.

To continue measuring the antler 4, another beam 6 is selected to be measured. It is understood that the next beam 6 selected for measurement is a beam not having a severed portion 22 adhered thereto, i.e. a beam that has not yet been measured. In other words, the steps of positioning the free end 18 of the measuring tape 10, extending the measuring tape 10 from the tip to a terminal point, severing the measuring tape 10 at the terminal point, and adhering the severed portion 22 to the selected beam are repeated until no more beams remain to be measured. The final result will be that every beam 6 that was measured will have a respective severed portion 22 adhered to it. As shown in FIG. 1, every beam 6 will have a severed portion 22 adhered to it with no severed portion 22 overlapping or intersecting any other severed portion 22.

When a respective severed portion 22 of the measuring tape 10 has been adhered to a respective beam 6, a user is able to visually inspect the last severed portion adhered to the antler 4 and locate the highest numerical indicia 14 to determine the total measurement or "score" of the antler 4. Unlike the prior art, a user does not need to add up a multitude of intermediate measurements, read and record multiple measurements, or take any other complicated action. Rather, the last indicia of the last portion of the measuring tape 10 is the final, complete, and total score. Referring to FIG. 1 as an example, one can quickly determine that the final and highest numerical indicia is "38"—the final score of the antler rack.

Accordingly, the method for measuring an antler rack provides the simplest, quickest, and most accurate means for scoring an antler rack. More particularly, the present invention avoids forgetting to measure any beam, mistakenly measuring the same beam more than once, provides an instant result without any calculations or recording of measurements.

It is understood that while certain forms of this invention have been illustrated and described, it is not limited thereto except insofar as such limitations are included in the following claims and allowable functional equivalents thereof.

The invention claimed is:

1. A method for measuring an antler rack having a plurality of beams, comprising the steps of:
   (a) providing a flexible measuring tape that includes a front surface having graduated upwardly ascending numerical indicia printed thereon and a rear surface having an adhesive layer;
   (b) positioning a free end of said measuring tape at a tip of a beam selected from the plurality of beams;
   (c) extending said measuring tape from the tip of the selected beam to a terminal point of the selected beam;
   (d) severing said measuring tape adjacent the terminal point of the selected beam so as to obtain a severed portion indicative of a length of the selected beam, said measuring tape including a remainder portion having a new free end;
   (e) adhering said severed portion to the main beam to indicate the selected beam has been measured;
   (f) positioning said new free end of said remainder portion of said measuring tape at a tip of another selected beam from the plurality of beams;
   (g) extending said remainder portion of said measuring tape from a tip of the another selected beam to a terminal point of the another selected beam;
   (h) severing another portion of said measuring tape adjacent the terminal point of the another selected beam so as to obtain another severed portion indicative of a length of the another selected beam, said remainder portion of said measuring tape including a remainder portion having a new free end;
   (i) adhering said another severed portion to the another selected beam to indicate the another selected beam has been measured;
   (j) repeating steps (f) through (i) on another selected beam that is not indicative of having been measured until no more beams remain unmeasured; and
   (k) visually locating the highest numerical indicia on a last severed portion of said measuring tape adhered to the antler rack so as to determine a total measurement or score of the antler without any tabulation.

2. The method as in claim 1, wherein said measuring tape is arranged on a roll having a free end, said numerical indicia ascending in value from said free end.

3. The method as in claim 1, wherein said measuring tape includes an adhesive backing strip positioned to cover said adhesive surface that is selectively removable when adhering a respective severed portion to a respective beam of the antler rack.

4. The method as in claim 1, wherein said numerical indicia includes one-eighth increments.

* * * * *